United States Patent
Hans et al.

(10) Patent No.: US 7,274,678 B2
(45) Date of Patent: Sep. 25, 2007

(54) METHOD AND SYSTEM FOR TRANSMITTING DATA, WITH TRANSMISSION ANTENNA DIVERSITY

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 975 days.

(21) Appl. No.: 10/204,943

(22) PCT Filed: Feb. 16, 2001

(86) PCT No.: PCT/DE01/00588

§ 371 (c)(1),
(2), (4) Date: Nov. 8, 2002

(87) PCT Pub. No.: WO01/63796

PCT Pub. Date: Aug. 30, 2001

(65) Prior Publication Data

US 2003/0128677 A1 Jul. 10, 2003

(30) Foreign Application Priority Data

Feb. 26, 2000 (DE) ................................ 100 09 150

(51) Int. Cl.
*H04Q 7/00* (2006.01)
(52) U.S. Cl. ...................... 370/332; 370/334
(58) Field of Classification Search ............... 370/332, 370/334, 329, 320, 314, 335, 441, 439, 532; 455/69
See application file for complete search history.

(56) References Cited

U.S. PATENT DOCUMENTS 5,369,670 A * 11/1994 Zagloul et al. ............. 375/330

(Continued)

FOREIGN PATENT DOCUMENTS

WO WO 98 27669 6/1998

(Continued)

OTHER PUBLICATIONS

J Goldberg et al.: "Downlink Beamforming For Cellular Mobile Communications" Phoenix, May 4-7, 1997, New York, IEEE, US, Bd. CONF.*

(Continued)

*Primary Examiner*—Edan Orgad
*Assistant Examiner*—Lawrence J Burrowes
(74) *Attorney, Agent, or Firm*—Kenyon & Kenyon LLP

(57) ABSTRACT

The present invention provides a data transfer method for use in a CDMA system operating in the TDD mode. A data signal is transmitted in the form of a data stream of data bursts of different users between a first station and a second station via a multiplicity of antennas, and a reference signal is transmitted in connection with the specific data burst. In a first step, a reference signal is transmitted from the second station to the first station. In a second step, a channel estimation is performed in the first station based on the reference signal that is received from the second station. In a third step, the first station transmits a data burst to the second station via the multiplicity of antennas, it being possible to modify the transmission signals of various antennas having various amplitude and phase factors in accordance with the channel estimation.

13 Claims, 1 Drawing Sheet

U.S. PATENT DOCUMENTS

| | | | |
|---|---|---|---|
| 5,615,409 A * | 3/1997 | Forssen et al. | 455/440 |
| 5,886,988 A * | 3/1999 | Yun et al. | 370/329 |
| 6,122,260 A * | 9/2000 | Liu et al. | 370/280 |
| 6,124,824 A * | 9/2000 | Xu et al. | 342/174 |
| 6,452,917 B1 * | 9/2002 | Leung | 370/342 |
| 6,519,478 B1 * | 2/2003 | Scherzer et al. | 455/562.1 |
| 6,615,024 B1 * | 9/2003 | Boros et al. | 455/67.14 |
| 6,721,299 B1 * | 4/2004 | Song | 370/342 |
| 7,020,071 B2 * | 3/2006 | Mujtaba | 370/208 |

FOREIGN PATENT DOCUMENTS

| | | |
|---|---|---|
| WO | WO 99 35764 | 7/1999 |

OTHER PUBLICATIONS

A Wittneben: "Analysis and Comparison of Optimal Predictive Transmitter Selection and Combining Diversity For Dect" Singapore, Nov. 14-16, 1995, New York, IEEE, US.*

K.D. Kammeyer: "Message Transmission, " 2nd edition, Information Technology Series, Teubner, Stuttgart, 1996**.

A. Klein, G.K. Kaleh, and P.W. Baier, "Zero Forcing and Minimum Mean-Square-Error Equalization for Multiuser Detection in Code Division Multiple Access Channels," IEEE Trans. Vehic. Tech., vol. 45 (1996), 276-287**.

Motorola: "Transmit Diversity Schemes Applied to the TDD mode (II)," 3GPP TSG RAN WGI document TSGR1#5(99)632**+, Jun. 1-4, 1999.

Motorola: "Transmit Diversity Schemes applied to the TDD mode," 3GPP TSG RAN WGI document TSGR1#3(99)186**+, Mar. 22-26, 1999.

Motorola: "Transmit Diversity Schemes applied to the TDD mode (II)," 3GPP TSG RAN WGI document TSGR1#5(99)632, Jun. 1-4, 1999.

Motorola: "Transmit Diversity Schemes applied to the TDD mode," 3GPP TSG RAN WGI document TSGR1#3(99)186, Mar. 22-26, 1999.

* cited by examiner

METHOD AND SYSTEM FOR TRANSMITTING DATA, WITH TRANSMISSION ANTENNA DIVERSITY

FIELD OF THE INVENTION

The present invention relates to a data transfer method and system, e.g. for use in a CDMA system in the TDD mode, a data signal being transmitted in the form of a data stream of data bursts of different users between a first station and a second station via a multiplicity of antennas, and a reference signal being transmitted in connection with each specific data burst.

Although it may in principle be applied to any data transmissions, the present invention and the problem underlying it are discussed with respect to a cellular CDMA data-transmission system (CDMA=Code Division Multiple Access), which employs a transmission mode that may require the transmission of a reference signal.

BACKGROUND INFORMATION

Using code division multiple access (CDMA=Code Division Multiple Access), a multiplicity of data streams may be transmitted at the same time over one common frequency band. In this context, the symbols of the data streams to be transmitted may be modulated using so-called spreading codes.

The data streams transmitted simultaneously using different codes may interfere with each other: multi-path diffusion may lead to the superimposition of sequentially transmitted data symbols (inter-symbol interference, ISI). CDMA coding and multi-path diffusion may cause multiple-user interference (multiple access interference, MAI).

The interferences may be eliminated, e.g., in the receiver, if the impulse response of the channel there is known, as may be described in K. D. Kammeyer: "Message Transmission," 2nd edition, Information Technology Series, Teubner, Stuttgart, 1996, and from A. Klein, G. K. Kaleh, and P. W. Baier, "Zero Forcing and Minimum Mean-Square-Error Equalization for Multiuser Detection in Code Division Multiple Access Channels," IEEE Trans. Vehic. Tech., Vol. 45 (1996), 276-287. The channel impulse response may be estimated from a received reference signal, e.g., in the receiver.

To assure a constantly satisfactory transmission, data may be simultaneously transmitted over a plurality of mobile radio channels. This may be achieved using a plurality of transmitting antennas (transmitting antenna diversity). Transmitting antenna diversity of this kind may improve the quality of mobile-radio-channel transmissions in a remarkable manner.

For CDMA mobile radio systems in the TDD mode, the following transmitting antenna diversity schemes may be conventional for the forward link (downlink), thus, e.g., from a base station to a mobile station.

In the Transmit Adaptive Array (TxAA) according to Motorola: "Transmit Diversity Schemes applied to the TDD mode (II)," 3GPP TSG RAN WG1 document TSGR1#5(99) 632, the signals of the individual users, before their summation in the baseband, are modified using a phase and amplitude factor.

In the Selection Transmit Diversity (STD) according to Motorola: "Transmit Diversity Schemes applied to the TDD mode (II)," 3GPP TSG RAN WG1 document TSGR1#5(99) 632, the signals of the individual users may be always emitted over only one antenna. For different users, different antennas may be selected.

In the Phase Alignment Transmit Diversity (PATD) according to Motorola: "Transmit Diversity Schemes applied to the TDD mode," 3GPP TSG RAN WG1 document TSGR1#3(99)186, the overall antenna signals may be modified in the baseband using a phase factor. The factor may be different for different antennas. It may be identical for all users on one antenna.

In all of these schemes, the transmission qualities of the mobile radio channels in the counter link may be determined in the transmitter. On the basis of the measured qualities, the parameters of the schemes may then be selected (Closed Loop Technology).

To be able to detect data transmitted using TxAA or STD in accordance with a Joint Detection Method (JD), it may be required for every user to perform its own channel estimation in the receiver.

When PATD is used, it may only be required in the forward link to estimate one channel in the JD receiver. However, in contrast to TxAA and STD, PATD may not employ any amplitude modifications for optimizing the transmission.

Customary diversity methods for the CDMA transmission in the forward link in the TDD mode therefore either may require great expense for channel estimation in the receiver (TXAA=Transmit Adaptive Array, STD=Selection Transmit Diversity), or they may be further improved qualitatively (PATD=Phase Alignment Transmit Diversity).

SUMMARY OF THE INVENTION

An idea underlying the present invention is that the transmission signals of the individual antennas may be modified both in their phase as well as in their amplitude.

An example method according to the present invention may achieve an improvement of the data transmission by transmitting via a multiplicity of antennas without the requirement of a plurality of channel estimations in the forward link in the JD reception. When the example method is used in the forward link, it may only be required to perform one channel estimation in the JD receiver. In particular, transmission may be improved compared to the use of PATD.

According to one example embodiment, the phase and amplitude factors may be kept constant during successive time segments.

According to one further example embodiment, phase factors $\phi_n$ and amplitude factors $A_n$ may be selected so that a maximization of the product $$P(\varphi_1, \ldots, \varphi_N, A_1, \ldots, A_N) = \prod_{k=1}^{K} \left| \sum_{n=1}^{N} \alpha_n^k \cdot A_n \cdot e_n^{i\varphi} \right|^2$$

may be achieved by varying antenna-specific phases $\phi_n$ and amplitudes $A_n$, given the secondary conditions $$\varphi_1 = 0 \text{ and } \sum_{n=1}^{N} A_n^2 = const.,$$

the channel estimation coefficient of the greatest output of the channel from the nth antenna to the kth user being designated as $\alpha_{nk}$, it being true that: n=1, . . . , N and k=1, . . . , K where N=number of antennas and K=number of users.

According to a further example embodiment, the first station may be a base station, and the second station may be a mobile station of a mobile radio system in the TDD mode, in particular a UMTS mobile radio system.

According to a further example embodiment, the transmission may be performed using the CDMA method.

DETAILED DESCRIPTION

Figure 1:
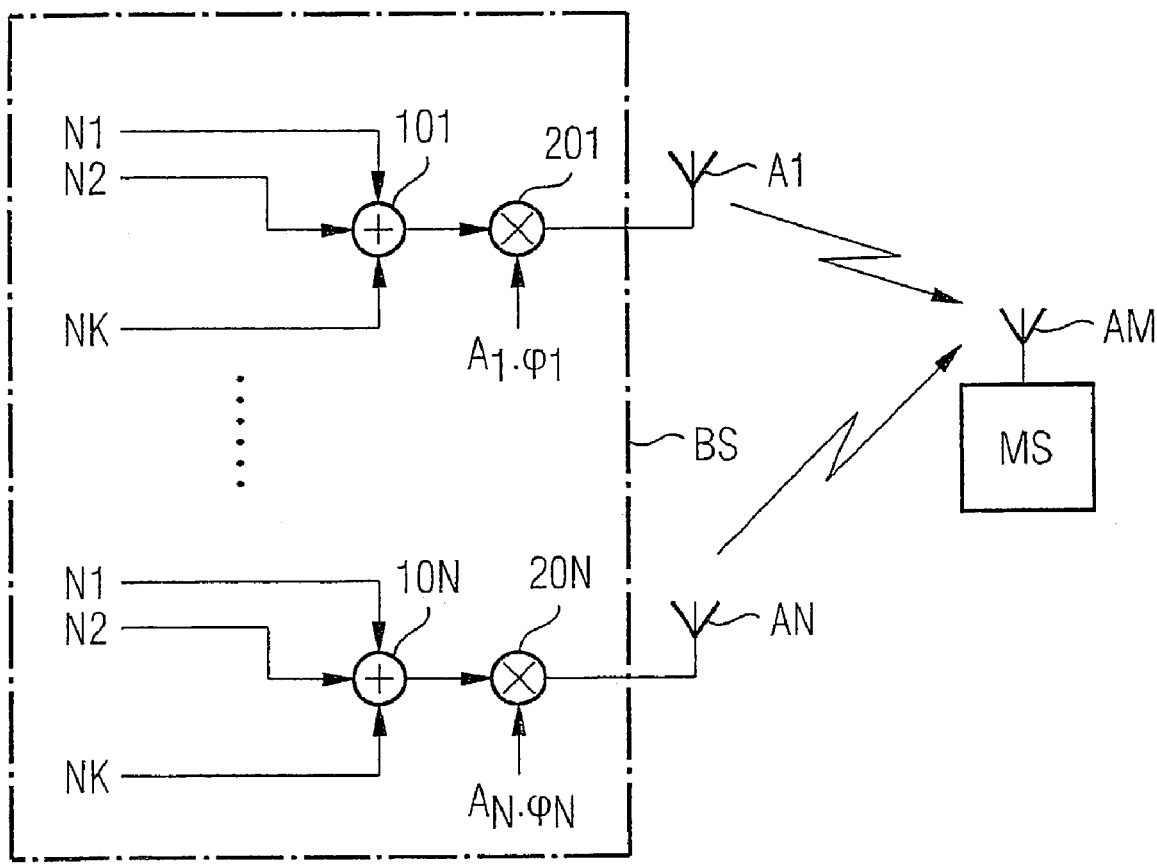
FIG. 1 shows a schematic representation of one example embodiment of a device according to the present invention for transmitting data over a multiplicity of antennas.

In the Figures, the same reference numerals designate the same or functionally equivalent elements.

Figure 2:
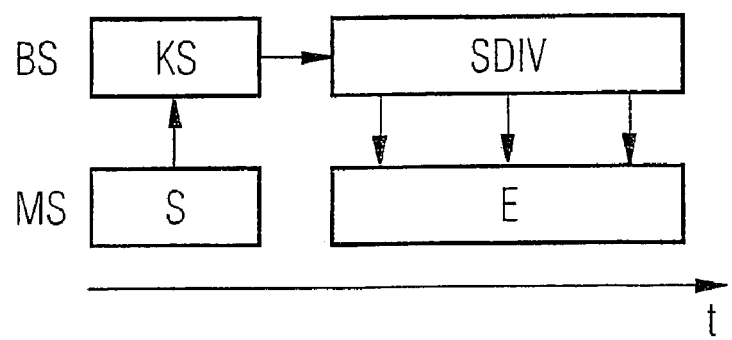
FIG. 2 shows a schematic representation of a temporal sequence of one example embodiment of an example method according to the present invention for transmitting data over a multiplicity of antennas using the device depicted in FIG. 1.

In FIGS. 1 and 2, N1 through NK designate specific users of the device, 101 through 10N a specific adder, 201 through 20N a specific multiplier, A1 through AN and AM a specific antenna, BS a base station, MS a mobile station, S a transmission step, KS a channel estimation step, SDIV a transmission step having antenna diversity, and E a reception step.

The example embodiment is a UMTS (Universal Mobile Telephone System) system in the TDD mode, the data signal being transmitted in the form of a data stream of data bursts of various users between a base station BS and a mobile station MS via a multiplicity of antennas A1-AN, and a reference signal being transmitted in connection with the respective data burst.

In this context, the transmission having transmission antenna diversity may be realized in the following manner.

First, an estimation occurs, in the usual manner, of the channels of all users N1 through NK in the reverse link via base station BS on the basis of a reference signal that is transmitted from the mobile station.

Thereafter, the determination of the highest output of the channel path is performed for every user channel. The associated channel estimation coefficient of the channel from the nth antenna to the kth user is designated as $\alpha_c^k$, it being true that: n=1, . . . , N and k=1, . . . , K where N=the number of antennas and K=number of users (in each case natural numbers).

Then a maximization of the product $$P(\varphi_1, \ldots, \varphi_N, A_1, \ldots, A_N) = \prod_{k=1}^{K} \left| \sum_{n=1}^{N} \alpha_n^k \cdot A_n \cdot e^{i\varphi}_n \right|^2$$

is performed by varying antenna-specific phases $\phi_n$ and amplitudes $A_n$ given the secondary conditions $$\varphi_1 = 0 \text{ and } \sum_{n=1}^{N} A_n^2 = const.$$

Then, the transmission of entire CDMA signal $A_n \cdot e^{i\phi}_n \cdot s(t)$ modified by phase $\phi_n$ and amplitude $A_n$ occurs, where s(t)=overall CDMA signal, via the nth transmission antenna of the forward link, as depicted in FIG. 1, to the mobile station.

FIG. 2 depicts the temporal sequence of an example data transfer method. In contrast to PATD, this method varies not only antenna-specific phases $\phi_n$ but also amplitudes $A_n$.

Initially, mobile station MS transmits a data burst having a reference signal data block to base station BS, which uses the data block for channel estimation. Based on the result of the channel estimation, the base station performs channel estimation KS. Then the aforementioned transmission of data having antenna diversity SDIV is performed from the base station to the mobile station, followed by reception E there.

Although the present invention was described above on the basis of an example embodiment, it is not limited thereto, but rather may be modified in many ways.

In particular, the method according to the present invention may be used in all data-transmission systems and is not limited to CDMA data transmission systems in the TDD mode.

In addition, the detection method for the amplitudes and phases may also be varied.

What is claimed is:

1. A method of transmitting a data signal in a form of a data stream of data bursts of different users between a first station and a second station via a multiplicity of antennas, a reference signal being transmitted in connection with a specific data burst, the method comprising:
    transmitting the reference signal from the second station to the first station;
    performing a channel estimation in the first station based on the reference signal received from the second station;
    transmitting a data burst from the first station to the second station via the multiplicity of antennas; and
    modifying transmission signals of different antennas using amplitude factors and phase factors corresponding to the channel estimation.

2. The method according to claim 1, wherein the method is performed using a CDMA system.

3. The method according to claim 2, wherein the CDMA system is operated in a TDD mode.

4. The method according to claim 1, wherein the first station includes a base station and the second station includes a mobile station of a mobile radio system in a TDD mode.

5. The method according to claim 4, wherein the mobile radio system includes a UMTS mobile radio system.

6. A method of transmitting a data signal in a form of a data stream of data bursts of different users between a first station and a second station via a multiplicity of antennas, a reference signal being transmitted in connection with a specific data burst, the method comprising:
    transmitting the reference signal from the second station to the first station;

performing a channel estimation in the first station based on the reference signal received from the second station;

transmitting a data burst from the first station to the second station via the multiplicity of antennas; and modifying transmission signals of different antennas using amplitude factors and phase factors corresponding to the channel estimation, wherein the phase factors and the amplitude factors are kept constant during successive time segments.

7. The method according to claim 6, further comprising:

selecting the phase factors $\phi_n$ and the amplitude factors $A_n$ so that a maximization of a product $$P(\varphi_1, \ldots, \varphi_N, A_1, \ldots, A_N) = \prod_{k=1}^{K} \left| \sum_{n=1}^{N} \alpha_n^k \cdot A_n \cdot e_n^{i\varphi} \right|^2$$

is achieved by varying antenna-specific phases $\phi_n$ and antenna-specific amplitudes $A_n$, given secondary conditions $$\varphi_1 = 0 \text{ and } \sum_{n=1}^{N} A_n^2 = const.,$$

a channel estimation coefficient of a greatest output of a channel from a nth antenna to a kth user being designated as $\alpha_n^k$, wherein n=1, . . . , N and k=1, . . . , K, where N=a number of antennas and K=a number of users.

8. A data transfer system for transmitting a data signal in a form of a data stream of data bursts of different users via a multiplicity of antennas, and for transmitting a reference signal in connection with a specific data burst, the system comprising:

a first station and a second station, the first station having a receiving device for receiving the reference signal that is transmitted from the second station to the first station, a channel estimation device for performing a channel estimation based on the reference signal received from the second station, and a modification device for modifying transmission signals of different antennas, using amplitude factors and phase factors corresponding to the channel estimation, for a data burst to be transmitted to the second station via the multiplicity of antennas.

9. The system according to claim 8, wherein the data signal is transmitted using a CDMA method operating in TDD mode.

10. A data transfer system for transmitting a data signal in a form of a data stream of data bursts of different users via a multiplicity of antennas, and for transmitting a reference signal in connection with a specific data burst, the system comprising:

a first station and a second station, the first station having a receiving device for receiving the reference signal that is transmitted from the second station to the first station, a channel estimation device for performing a channel estimation based on the reference signal received from the second station, and a modification device for modifying transmission signals of different antennas, using amplitude factors and phase factors corresponding to the channel estimation, for a data burst to be transmitted to the second station via the multiplicity of antennas, wherein the modification device is configured to hold constant the phase and amplitude factors during successive time segments.

11. The system according to claim 10, wherein the first station includes a base station, and the second station includes a mobile station of a mobile radio system in the TDD mode.

12. The system according to claim 11, wherein the mobile radio system includes a UMTS mobile radio system.

13. A data transfer system for transmitting a data signal in a form of a data stream of data bursts of different users via a multiplicity of antennas, and for transmitting a reference signal in connection with a specific data burst, the system comprising:

a first station and a second station, the first station having a receiving device for receiving the reference signal that is transmitted from the second station to the first station, a channel estimation device for performing a channel estimation based on the reference signal received from the second station, and a modification device for modifying transmission signals of different antennas, using amplitude factors and phase factors corresponding to the channel estimation, for a data burst to be transmitted to the second station via the multiplicity of antennas, wherein the modification device is configured to select the phase factors $\phi_n$ and the amplitude factors $A_n$ such that a maximization of a product $$P(\varphi_1, \ldots, \varphi_N, A_1, \ldots, A_N) = \prod_{k=1}^{K} \left| \sum_{n=1}^{N} \alpha_n^k \cdot A_n \cdot e_n^{i\varphi} \right|^2$$

is achieved by varying antenna-specific phases $\phi_n$ and antenna-specific amplitudes $A_n$, given secondary conditions $$\varphi_1 = 0 \text{ and } \sum_{n=1}^{N} A_n^2 = const.,$$

a channel estimation coefficient of a maximum output of a channel from a nth antenna to a kth user being designated as $\alpha_n^k$, wherein n=1, . . . , N and k=1, . . . , K where N=a number of antennas and K=a number of users.

* * * * *